(12) United States Patent
Raza et al.

(10) Patent No.: US 11,469,855 B2
(45) Date of Patent: Oct. 11, 2022

(54) METHODS AND SYSTEMS FOR TRANSMITTING DATA PAYLOADS

(71) Applicant: Kabushiki Kaisha Toshiba, Tokyo (JP)

(72) Inventors: Usman Raza, Bristol (GB); Michael Baddeley, Bristol (GB); Aleksandar Stanoev, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 17/173,431

(22) Filed: Feb. 11, 2021

(65) Prior Publication Data
US 2022/0255664 A1 Aug. 11, 2022

(51) Int. Cl.
*H04L 1/00* (2006.01)
*H04L 1/22* (2006.01)

(52) U.S. Cl.
CPC .......... *H04L 1/0084* (2013.01); *H04L 1/0057* (2013.01); *H04L 1/0061* (2013.01); *H04L 1/22* (2013.01)

(58) Field of Classification Search
CPC ... H04L 1/0051; H04L 1/0061; H04L 1/0084; H04L 1/22; H04L 1/1829
See application file for complete search history.

(56) References Cited

U.S. PATENT DOCUMENTS

| | | | |
|---|---|---|---|
| 7,889,707 B2 | 2/2011 | Niu et al. | |
| 10,356,762 B2* | 7/2019 | Qu | H04W 76/15 |
| 2009/0122747 A1* | 5/2009 | In | H04B 7/2606 370/315 |
| 2011/0032937 A1* | 2/2011 | Gould | H04L 12/5692 370/392 |
| 2014/0289581 A1* | 9/2014 | Maret | H04L 1/1829 714/751 |

OTHER PUBLICATIONS

Ferrari, F. et al., "Efficient Network Flooding and Time Synchronization with Glossy," Proceedings of the 10th ACM/IEEE International Conference on Information Processing in Sensor Networks. IEEE, 2011, 12 pages.
Al Nahas, B. et al., "BlueFlood: Concurrent Transmissions for Multi-Hop Bluetooth 5—Modeling and Evaluation," arXiv:2002.12906v3 [cs.NI], Jan. 10, 2021, 30 pages.

* cited by examiner

*Primary Examiner* — Shelly A Chase
(74) *Attorney, Agent, or Firm* — Oblon, McClelland, Maier & Neustadt, L.L.P.

(57) ABSTRACT

A method of transmitting a data payload from one or more network nodes. The method includes transmitting a first data packet from a network node of the one or more network nodes and subsequently transmitting a second data packet from the network node of the one or more network nodes. The first data packet includes a set of blocks arranged in a first order and the second data packet including the set of blocks arranged in a second order that is different from the first order. Each block of the set of blocks includes a different section of the data payload and the sections of the data payload included by blocks of the set of blocks together define the entire data payload.

20 Claims, 5 Drawing Sheets

METHODS AND SYSTEMS FOR TRANSMITTING DATA PAYLOADS

FIELD

Embodiments described herein relate to methods of digitally transmitting and receiving data payloads with reduced error rates, particularly when simultaneously transmitting data payloads with multiple network nodes.

BACKGROUND

In digital data transmission, noise, interference, or other factors can result in a receiver not correctly receiving one or more bits of a data packet transmitted by a source. Methods or correcting and/or detecting such errors comprise adding redundancy to data transmissions, for example by adding check or parity bits to data and/or by retransmitting data multiple times.

Efficient Network Flooding and Time Synchronization with Glossy (Ferrari, Federico et al. Proceedings of the 10th ACM/IEEE International Conference on Information Processing in Sensor Networks. IEEE, 2011) presents an architecture known as Glossy for flooding data packets in IEEE 802.15.4 wireless networks, in which transmission errors common. In Glossy, network nodes which receiving a data packet retransmit the packet either immediately or at a fixed time after its receipt. As neighbouring nodes receive wirelessly transmitted packets approximately simultaneously, they will retransmit these packets approximately simultaneously and their retransmissions will therefore interfere constructively rather than destructively, thereby reducing the chance of errors during retransmissions. Nodes continue to retransmit the packet each time they receive a copy of the packet either until they have performed a pre-set number of transmissions, or until a pre-set time has elapsed since the initiation of the flood. The number of transmissions is counted using a relay counter bit in the packet, which is incremented with each retransmission, and the time since initiation of the flood is estimated using the counted number of transmissions and an estimated time between subsequent transmissions.

US patent U.S. Pat. No. 7,889,707B2 discloses a method of transmitting a data payload in which the payload is divided into multiple fragments with separate error correction block codes, with different fragments' block codes having different coding gains in dependence upon the importance of data therein.

Arrangements of the embodiments will be understood and appreciated fully from the following detailed description, made by way of example only and taken in conjunction with the drawings in which.

DETAILED DESCRIPTION

Figure 1:
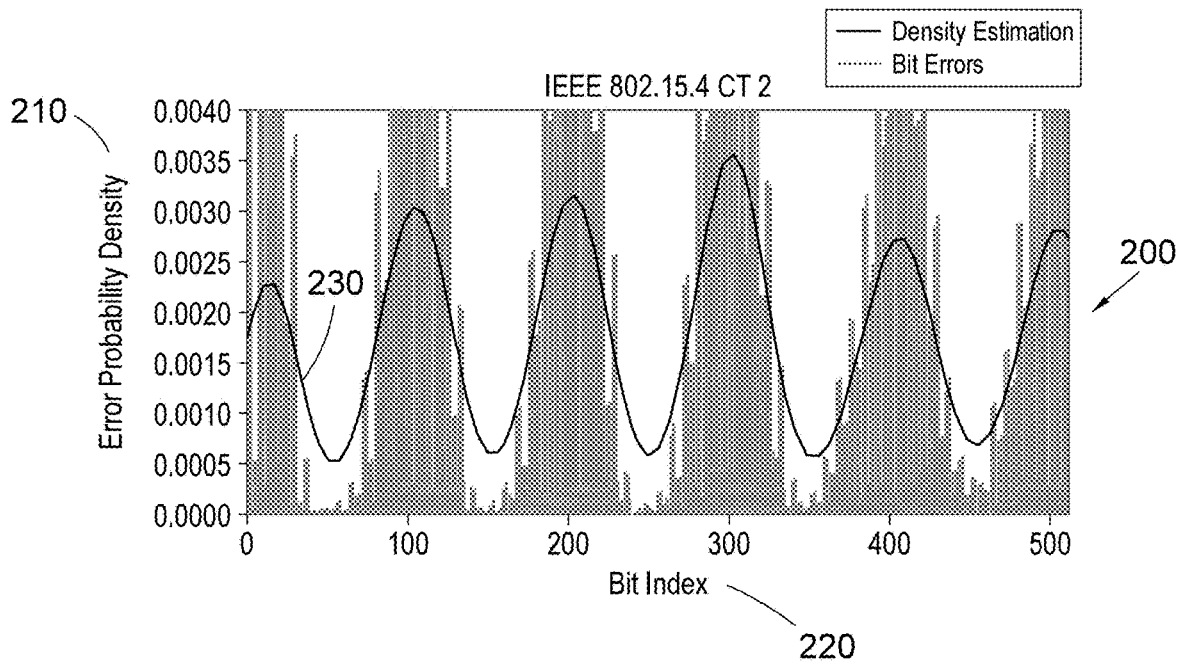
FIG. 1 shows a distribution of experimentally determined bit error probabilities for different bit locations within the length of a data packet transmitted simultaneously by a pair of IEEE 802.15.4 transmitters.

According to an embodiment there is provided a method of transmitting a data payload from one or more network nodes, the method comprising: transmitting a first data packet from a network node of the one or more network nodes, the first data packet comprising a set of blocks arranged in a first order; subsequently transmitting a second data packet from the network node of the one or more network nodes, the second data packet comprising the set of blocks arranged in a second order that is different from the first order; wherein each block of the set of blocks comprises a different section of the data payload; and wherein the sections of the data payload comprised by blocks of the set of blocks together define the entire data payload.

Varying the order of blocks that encode the different parts of the data payload between data packet transmissions advantageously varies which of the blocks are transmitted with relatively high bit error probabilities in situations in which the bit error probabilities are not uniform across the length of a packet. This advantageously increases the probability of a receiver successfully receiving all of the blocks (and by extension all of the parts of the data payload) over the course of the transmissions of the data packets. The individual error detection codes of the blocks allow receiving network nodes to identify which of the blocks in a received data packet contain errors independently.

The one or more network nodes may be a plurality of network nodes and each of the first and second data packets (and/or any additional data packets as described below) may be transmitted substantially simultaneously by some or all of the plurality of network nodes. The same or different network nodes may transmit different data packets.

The method may further comprise subsequently transmitting one or more additional data packets that comprise the set of blocks. The one or more additional data packets may comprise the set of blocks arranged in an order different to the first and second orders and/or in an order different from the orders in which the set of blocks are arranged in some or any of other additional data packets.

The first and second orders in which the set of blocks are arranged in the first and second data packets (and/or the orders in which the blocks are arranged in any additional data packets) may be determined based on a time at, and/or a timeslot in which the data packets are transmitted. Such first and second orders (and/or orders of additional data packets) may be determined using a timeslot counter of a time slotted channel hopping channel access method, such as 6TiSCH.

One, some or each of the set of blocks may comprise an error detection code calculated from the section of the data payload that is comprised by that block. The error detection code comprised by each such block may be a cyclic redundancy check.

One, some or each of the series data packets may further comprise a packet-level error detection code calculated from all parts of that data packet other than the packet-level error detection code itself.

The order in which the blocks are arranged in some or each of the data packets may be a pseudorandom order, such as an order determined using a pseudorandom seed and/or pseudorandom generator.

The first and second orders in which the set of blocks are arranged in the first and second data packets (and/or the orders in which the set of blocks are arranged in any additional data packets) may be determined using a lookup table and/or a pseudorandom generator, which may use a seed derived from a timeslot counter.

According to an embodiment, there is provided method of receiving a data payload, the method comprising inspecting one or more data packets comprising the same set of blocks, wherein each block of the set of blocks comprises a part of the data payload and an error detection code calculated from that part, and wherein inspecting a data packet comprises: identifying each block of the set of blocks within the data packet; checking the error detection code comprised by at least one identified block of the set of blocks to determine whether that block was received with errors; saving each block that is determined to have been received without errors in a buffer as a correct copy of that block; determining if said buffer contains a correct copy of each block of the set of blocks, and inspecting a subsequent data packet if said buffer does not contain a correct copy of each block of the set of blocks.

The method may be used to receive a data payload transmitted using a method as described above, such as a method as described above in which each of the set of blocks comprises an error detection calculated from the section of the data payload that is comprised by that block.

The method may additionally comprise receiving the data packet. In some embodiments, inspecting a data packet may comprise receiving that data packet. If the buffer does not contain a correct copy of each block of a set of blocks a subsequent data packet may be listened for, received, and/or inspected.

Each block of the set of blocks may be identified within the data packet using an order of the blocks that is determined from a time at, or a timeslot in which, the packet is received. As described above such orders may be determined using a timeslot counter of a time slotted channel hopping channel access method, such as 6TiSCH. In some embodiments, inspecting the data packet may comprise reordering the blocks of the set of blocks, for example into an order corresponding to the order of the parts of the data payload comprised by and/or encoded within the blocks.

In some embodiments, inspecting a data packet comprises checking the error detection code comprised by a plurality of identified blocks and/or each identified block of the set of blocks to determine whether that block was received with errors.

Inspecting one of the data packets may further comprise: saving each block that is determined to have been received with errors in a buffer as a corrupted copy of that block; applying majority logic decoding to three or more corrupted copies of a corrupted block to recover a copy of that block, checking the error detection code comprised by the recovered block to determine whether the recovered block comprises errors; and/or saving the recovered copy of the block as a correct copy of the block if the recovered copy of the block is determined to not comprise errors.

In some embodiments, inspecting a data packet comprises checking the error detection code comprised by each identified block of the set of blocks that a correct copy of is not stored in the buffer.

In other embodiments, inspecting a data packet comprises checking the error detection code comprise each identified block of the set of blocks; in such embodiments, multiple correct copies of one or more blocks may be stored in the buffer, and inspecting a data packet may comprise applying majority logic decoding to three or more correct copies of a block stored in the buffer if three or more correct copies of that block are stored in the buffer.

Each of the one or more data packets may further comprise a packet-level error detection code calculated from all parts of that data packet other than the packet-level error detection code itself, and inspecting a data packet may comprise checking the packet-level error detection code of the data packet to determine whether the entire data packet was received without errors. In such embodiments, the steps of inspecting individual blocks of the data packet described above (i.e. identifying the blocks and checking their error detection codes etc.) may only be performed if the entire data packet is not determined to have been received without errors.

Each of the one or more data packets may further comprise a packet ID and inspecting a subsequent data packet may comprise checking the packet ID of a received data packet to determine whether it comprises the same set of blocks as the preceding data packet. Inspecting a data packet may comprise discarding copies of blocks stored in the buffer if the subsequent data packet is determined to comprise a different set of blocks to the preceding data packet.

According to an embodiment there is provided a method of transmitting a data payload from one or more first network nodes to a second network node, the method comprising: transmitting a first data packet from a network node of the one or more first network nodes, the first data packet comprising a set of blocks arranged in a first order, each block of the set of blocks comprising a different section of the data payload and an error detection code calculated from that part, and the sections of the data payload comprised by blocks of the set of blocks together defining the entire data payload; subsequently transmitting a second data packet from the network node of the one or more first network nodes the second data packet comprising the set of blocks arranged in a second order that is different from the first order; and inspecting at least the first data packet with the second network node, wherein inspecting a data packet comprises: identifying each block of the set of blocks within the data packet; checking the error detection code comprised by at least one identified block of the set of blocks to determine whether that block was received with errors; saving each block that is determined to have been received without errors in a buffer as a correct copy of that block; determining if said buffer contains a correct copy of each block of the set of blocks; and wherein the method further comprises inspecting the second data packet if said buffer does not contain a correct copy of each block of the set of blocks upon inspecting the first data packet.

Such a method may comprise any of the optional features described above with reference to method of transmitting or receiving a data payload.

According to an embodiment, there is provided a wireless network node comprising an antenna, an output module, a processor, and a memory storing computer instructions executable by the processor, the computer instructions when executed by the processor causing the processor to perform a method of transmitting a data payload from the wireless network node, the method comprising: transmitting a first data packet from the wireless network node, the first data packet comprising a set of blocks arranged in a first order; subsequently transmitting a second data packet from the wireless network node, the second data packet comprising the set of blocks arranged in a second order that is different from the first order; wherein each block of the set of blocks comprises a different section of the data payload; and wherein the sections of the data payload comprised by blocks of the set of blocks together define the entire data payload.

According to an embodiment, there is provided a wireless network node comprising an antenna, an input module, a buffer, a processor, and a memory storing computer instructions executable by the processor, the computer instructions when executed by the processor causing the processor to perform a method of receiving a data payload, the method the method comprising inspecting one or more data packets comprising the same set of blocks, wherein each block of the set of blocks comprises a part of the data payload and an error detection code calculated from that part, and wherein inspecting a data packet comprises: identifying each block of the set of blocks within the received data packet; checking the error detection code comprised by at least one identified block of the set of blocks to determine whether that block was received with errors; saving each block that is determined to have been received without errors in the buffer as a correct copy of that block; determining if said buffer contains a correct copy of each block of the set of blocks, and inspecting a subsequent data packet if said buffer does not contain a correct copy of each block of the set of blocks.

The wireless network nodes may be configured to perform methods comprising any of the optional features described above with reference to method of transmitting or receiving a data payload. In an embodiment, a wireless node comprises instructions that when executed by a processor perform a method of transmitting a data payload as described above, and instructions that when executed by a processor perform a method of receiving a payload as described above.

According to an embodiment, there is provided one or more non-transitory storage media comprising computer instructions executable by one or more processors, the computer instructions when executed by the one or more processors causing the one or more processors to perform a method of transmitting a data payload from one or more network nodes, the method comprising: transmitting a first data packet from a network node of the one or more network nodes, the first data packet comprising a set of blocks arranged in a first order; subsequently transmitting a second data packet from the network node of the one or more network nodes, the second data packet comprising the set of blocks arranged in a second order that is different from the first order; wherein each block of the set of blocks comprises a different section of the data payload; and wherein the sections of the data payload comprised by blocks of the set of blocks together define the entire data payload.

According to an embodiment, there is provided one or more non-transitory storage media comprising computer instructions executable by one or more processors, the computer instructions when executed by the one or more processors causing the one or more processors to perform a method of receiving a data payload, the method the method comprising inspecting one or more data packets comprising the same set of blocks, wherein each block of the set of blocks comprises a part of the data payload and an error detection code calculated from that part, and wherein inspecting a data packet comprises: identifying each block of the set of blocks within the data packet; checking the error detection code comprised by at least one identified block of the set of blocks to determine whether that block was received with errors; saving each block that is determined to have been received without errors in a buffer as a correct copy of that block; determining if said buffer contains a correct copy of each block of the set of blocks, and inspecting a subsequent data packet if said buffer does not contain a correct copy of each block of the set of blocks.

The computer instructions may be configured to perform methods comprising any of the optional features described above with reference to method of transmitting or receiving a data payload. In an embodiment, one or more non-transitory storage media comprise instructions that when executed by a processor perform a method of transmitting a data payload as described above, and instructions that when executed by a processor perform a method of receiving a payload as described above.

Substantially simultaneous transmissions used by the Glossy flooding architecture, and by other data transmission protocols, are intended to cause the multiple substantially simultaneous transmissions of a data packet to constructively interfere, thereby increasing their signal strength and reducing the probability of transmission errors due to noise. However, it has been found that when such synchronous transmissions are made, the probability of a bit being received with an error is dependent upon the position of the bit within the length of the simultaneously transmitted data packet.

FIG. 1 shows a distribution 200 of experimentally determined bit error probabilities 210 for different bit locations (bit index 220) within the length of a data packet transmitted simultaneously by a pair of transmitters to a single receiver within an IEEE 802.15.4 physical layer sending data at 250 kbps. The bit index 220 increases from one for the first most significant bit of the packet to five hundred and ten for the final least significant bit. The distribution of bit error probabilities 210 comprises periodic bursts of relatively high error probabilities approximately every one hundred bits separated by stretches of low error probabilities. An oscillating curve 230 has been fit to the experimentally measured bit error probabilities 210.

Figure 2:
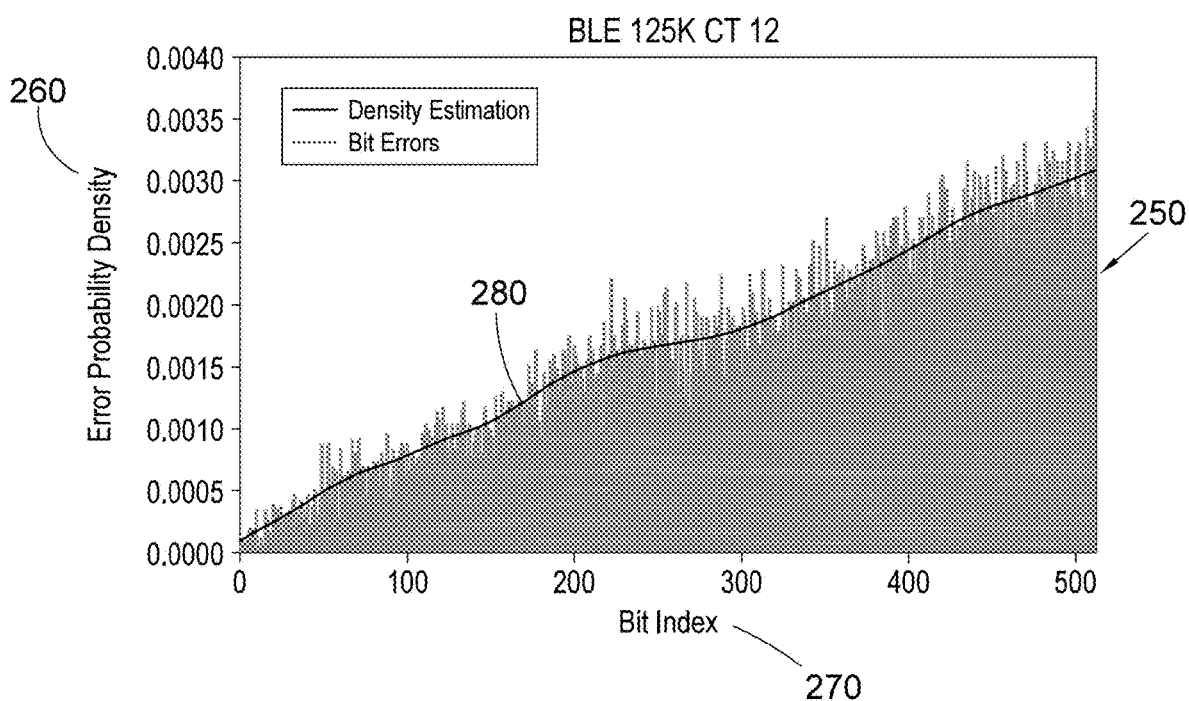
FIG. 2 shows a distribution of experimentally determined bit error probabilities for different bit locations within the length of a data packet transmitted simultaneously by twelve Bluetooth® Low Energy transmitters.

FIG. 2 shows a distribution 250 of experimentally determined bit error probabilities 260 for different bit locations (bit index 270) within the length of a similar data packet transmitted simultaneously by twelve transmitters to a single receiver within a Bluetooth® Low Energy (BLE) physical layer operating at a data rate of 125 kbps. For packets transmitted by the twelve BLE transmitters, the distribution of bit error probabilities 260 increases monotonically with the bit index. As in FIG. 1, the bit index 270 increases from one for the first most significant bit of the packet to five hundred and ten for the final least significant bit, and the distribution has a curve 280 fit to the experimentally measured bit error probabilities 260.

The variations in bit error probabilities 210, 260 during synchronous transmissions may be a result of the multiple transmitters that simultaneously transmit a data packet having imperfect oscillators that generate carrier signals at slightly differing frequencies. The bit error probability of each bit depends upon the time into the length of the packet at which that bit is transmitted, and therefore indirectly depends upon the position in the packet of that bit and upon the rate at which bits are transmitted in the packet. The distributions 200, 250 of bit error probabilities 210, 260 for both the two IEE 802.15.4 transmitters and the twelve BLE transmitters limit the reliability of successfully receiving all bits of longer data packets comprising more bits (and/or data packets transmitted with lower data rates and therefore longer transmission times).

Embodiments described herein relate to improved methods for transmitting a data payload between nodes of a network using multiple data packets comprising different arrangements of a set of blocks encoding the payload in parts, and to systems configured to transmit data payloads using such methods. Such methods may advantageously improve the reliability with which data payloads can be transmitted in situations, such as those described above, in which the probability of bit errors varies across the length of the data packet, without significantly increasing the latency of such transmissions.

Figure 3:
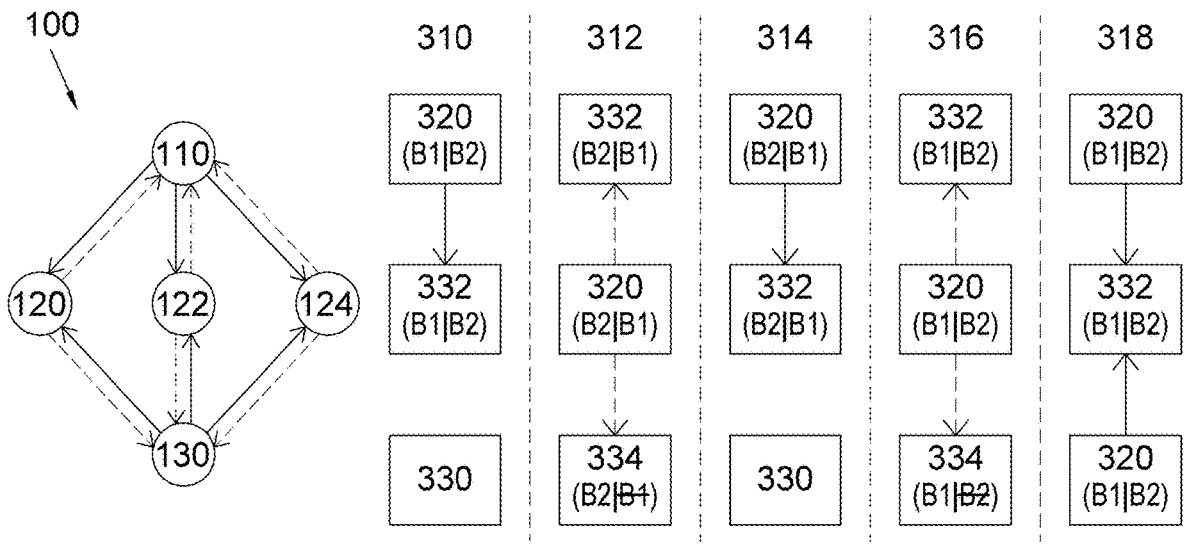
FIG. 3 shows an example of a data payload being flooded through the nodes of the wireless network using an embodiment of a transmission method in which the payload is divided into portions that are separately encoded as blocks that are arranged in different orders in different data packet transmissions.

FIG. 3 shows an example of an embodiment of such a transmission method being used to flood a data payload though nodes 110, 120, 122, 124, 130 of a multi-hop IEEE 802.15.4 wireless network 100. The transmission method uses a modified Glossy flooding protocol in which transmitted data packets comprise different arrangements of a set of two blocks B1, B2 encoding parts of the data payload to flood the data payload through the nodes 110, 120, 122, 124, 130 of the network 100.

A left portion of FIG. 3 shows a diagram of the arrangement of the five nodes 110, 120, 122, 124, 130 on the left, with the first node 110 in an upper level, the second to fourth nodes 120, 122, 124 in the second to fourth nodes in a middle level, and the fifth nodes 130 in a lower level. A right portion of FIG. 3 shows the actions performed by each of these three subsets of the nodes 110, 120, 122, 124, 130 in each of five successive timeslots 310, 312, 314, 316, 318. The action performed by each of the three subsets of nodes aligned with the position of those nodes in the left portion of FIG. 3.

As in standard Glossy flooding protocol implementations, the transmission method uses multiple transmissions of data packets encoding the data payload and simultaneous transmissions of data packets with multiple nodes to increase the probability of the data payload being flooded to all nodes of the network 100. However, as described above with reference to FIGS. 1 & 2 variations in bit error probabilities across the length of simultaneous transmissions by nodes one hop away from each other result in increased bit error probabilities in certain parts of the simultaneously transmitted packets. The method therefore varies the order of the two blocks B1, B2 between data packets in order to vary which encoded part of the payload is transmitted with higher bit error probabilities between timeslots.

The wireless network comprises five wireless devices that define first to fifth nodes 110, 120, 122, 124, 130 of the network. The first node 110, from which the illustrated data payload originates, is able to communicate directly with second, third and fourth nodes 120, 122, 124, but is unable to communicate directly with the fifth node 130, for example, because the fifth node 130 is out of range of the first node 110. Data transmissions between the first and fifth nodes 110, 130 must therefore be relayed via at least one of the second to fourth nodes 120, 122, 124. The second to fourth nodes 120, 122, 124 may therefore be referred to as a single hop away from the initiator node 110, and the fifth node 130 may be referred to as two hops away from the initiator node 110.

The embodiment of the transmission method shown in FIG. 3 differs from other Glossy flooding protocol implementations in that the data packets in which the payload is transmitted comprise a first block B1, and a second block B2, each comprising one half of the payload and an error-detection code calculated from that half of the payload. The order of the two blocks B1, B2 in each data packet is dependent upon the time interval in which that data packet is transmitted, such that all nodes which transmit or retransmit data packets in a given time interval transmit the same data packets with the two blocks in the same order. In the example transmission shown in FIG. 3 the two blocks B1, B2 are fifty bits in length. The packets may comprise additional elements, such as headers preceding the blocks B1, B2 and/or packet-level error detection codes following the blocks B1, B2, such as cyclic redundancy checks.

In FIG. 3 the order of blocks within transmitted and received data packets are shown in parenthesis following the reference numeral for that transmission 320, successful reception 332, or unsuccessful reception 334, with unsuccessfully received blocks being struck through. For example, a transmission 320 of a data packet comprising the first block B1 followed by the second block B2 is annotated 320 (B1|B2) and a reception of a data packet comprising a successfully reception of the second block B2 followed by an unsuccessful reception of the first block B1 is annotated 334 (B2|). Transmissions 320 by the first and fifth nodes 110, 130 (either individually or simultaneously) are shown as solid arrows, and synchronous transmissions 320 by the second to fourth nodes 120, 122, 124 are shown as dashed arrows.

In a first time interval 310, the first node 110 initiates the flooding of the data payload by transmitting 320 (B1|B2) a data packet comprising the first block B1 followed by the second block B2. During this transmission 320 (B1|B2) by the first node 110, the other nodes 120, 122, 124, 130 listen 330 to receive data packets, and the transmitted data packet is received without errors 332 (B1|B2) by the second to fourth nodes 120, 122, 124 but is not received by the out-of-range fifth node 130. The second to fourth nodes 120, 122, 124 use the error detection codes of the two blocks B1, B2 to verify that they have received 332 (B1|B2) both blocks B1, B2 without errors. In the illustrated example, the second to fourth nodes 120, 122, 124 all successfully receive 332 (B1|B2) both blocks B1, B2 without errors.

In standard Glossy flooding protocol implementations, after a transmission initiating a flood, network nodes only transmit data packets immediately or at a fixed time after they successfully receive a data packet in its entirety, in which case they retransmit a copy of that data packet. However, in the method illustrated in FIG. 3, network nodes are able to successfully receive individual blocks B1, B2 in data packets that are received with errors. It is therefore possible for a node to receive both blocks B1, B2 over the course of two separate time intervals, without ever successfully receiving a data packet in its entirety. Therefore, in the method shown in FIG. 3 nodes are configured to transmit 320 data packets at immediately or at a fixed delay time after successfully receiving both of the two blocks 31, B2 in a single data packet 332, or after successfully receiving one of the two blocks B1, B2 in a data packet 334 while having previously successfully received the other of the two blocks B1, B2 in a preceding packet 334.

The nodes are configured to transmit 320 data packets comprising the blocks B1, B2 in an order dependent upon the time interval in which the transmission takes place, rather than on the order in which the blocks B1, B2 were received by the node. In the first time interval 310 of the flooding process illustrated in FIG. 3, the first block B1 is followed by the second block B2; in the second and third time intervals 312, 314, the second block B2 is followed by the first block B1; and in the fourth and fifth time intervals 316, 318, the first block B1 is followed by the second block B2.

Nodes receiving data packets may identify which of the two blocks comprised by the received data packet is the first block B1 and which is the second block B2 from the packet itself (for example, wherein the data packet comprises bits specifying the block sequence and an error detection code therefor), from the individual blocks themselves, and/or from a relationship or schedule of block orderings in different time intervals known to each of the nodes.

In the second time interval 312 illustrated in FIG. 3, the second to fourth nodes, 120, 122, 124 which successfully received 332 (B1|B2) both blocks B1, B2 in the first time interval 310, synchronously transmit 320 (B2|B1) data packets comprising the second block B2 followed by the first block B1, while the first and fifth nodes 110, 130 listen 330.

The three transmitting receivers 120, 122, 124 are equipped with their own local oscillators that drift independently from each other and the bit error probability of a transmission from these three nodes 120, 122, 124 to any receiving node therefore increases monotonically from the start to the end of the transmitted packet. Therefore, the fifth node 130 receives the data packet with errors in one or more bits near the end of the data packet 334. However, as the data packet comprises two separately encoded blocks, the fifth node 130 successfully receives 334 (B2|) the second block B2, which is transmitted in the first half of the data packet but does not receive the first block B1. The fifth node 130 identifies which of the blocks B1, B2 it has successfully received using the error detection codes comprised thereby. The first node 110 successfully receives 332 (B2|B1) both the second block B2 and the following first block B1 without errors.

In a third time interval 314, the first node 110 transmits 320 (B2|B1) a data packet comprising the second block B2 followed by the first block B1, while the second to fifth nodes 120, 122, 124, 130 listen 330. In the illustrated flooding operation, the second to fourth nodes 120, 122, 124 successfully receive 332 (B2|B1) the entire data packet, while the fifth node 130 is out of range and does not receive the data packet.

In the fourth time interval 316, the second to fourth nodes, 120, 122, 124 which successfully received 332 (B2|B1) both blocks B1, B2 in the third time interval 314, synchronously transmit 320 (6l1132) data packets comprising the first block B1 followed by the second block B2, while the first and fifth nodes 110, 130 listen 330. As in the second time interval 312, the first node 110 successfully receives 332 (B1|B2) the entire data packet without errors, while the fifth node 130 receives 334 the data packet with errors in one or more bits near the end of the data packet. The fifth node 130 therefore only successfully receives 334 (B1|) the first block B1 comprised by the first half of the data packet. However, as the fifth node has previously successfully received 334 (B2|) the second block B2 in the second time interval 312, the fifth node has successfully received both blocks B1, B2 and therefore the entire data payload within the four time intervals 310, 312, 314, 316. If the data blocks B1, B2 were not reordered between the different time intervals, both data packets received by the fifth node 130 would have had errors in the same parts thereof, and the fifth node would therefore not have successfully received the data payload within the four time intervals.

In the fifth time interval 318, the first and fifth nodes 110, 130, which have received both blocks B1, B2 since their last previous transmission, transmit 320 (B1|B2) data packets comprising the first block B1 followed by the second block B2, while the second to fourth nodes 120, 122, 124 listen. Such transmissions by the first and fifth nodes 110, 130 will be a substantially simultaneous due to both being transmitted immediately, or at a fixed time after, their reception 334 of a packet in the fourth time interval 316. In the illustrated fifth time interval 318, the second to fourth nodes 120, 122, 124 successfully receive 332 (B1|B2) both blocks. It will be appreciated that in other iterations of the method, one, some, or all of these nodes might not receive one or both of the blocks B1, B2 due to variation in bit error probabilities across the length of the packet as described above.

Figure 4:
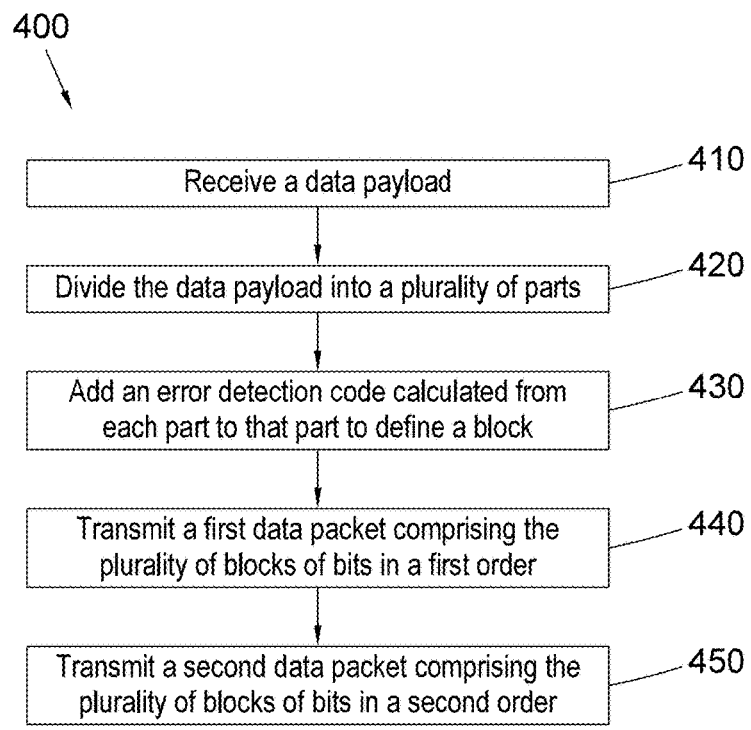
FIG. 4 is a flowchart showing an embodiment of a method of operating one or more network nodes to transmit a data payload.

FIG. 4 is a flowchart showing an embodiment of a method 400 of operating one or more network nodes to transmit a data payload. The method 400 uses multiple transmissions of data packets comprising different orders of blocks separately encoding portions of the data payload.

The first step 410 of the method 400 comprises receiving the data payload. The one or more network nodes may receive the data payload from the application layer of the network, may receive the payload in a transmission from one or more other network nodes, and/or may generate the payload themselves.

The second step 420 of the method 400 comprises dividing the payload into a plurality of parts. The number of parts into which the payload is divided (and consequently the number of blocks of bits defined by adding error detection codes to the parts in the third step 430) is preferably selected to achieve a block length in bits and/or time equal to or less than a length of a bit error probability distribution of packets transmitted by the one or more nodes that has relatively low bit error probabilities (for example, below a maximum bit error probability threshold). The plurality of portions into which the payload is divided are preferably of equal length, such that the blocks derived therefrom by the addition of the error detection codes are of equal length.

The third step 430 of the method 400 comprises adding an error detection code calculated from each part to that part to define a block. The method 400 may comprise calculating the error detection code from each of the parts of the payload. The error detection codes may be added to the end of the parts of the payload. In preferred embodiments, some or all of the error detection codes are cyclic redundancy checks (CRCs). Such error detection codes may be referred to as block-level error detection codes.

The fourth step 440 of the method 400 comprises transmitting a first data packet with the one or more network nodes, the first data packet comprising the plurality of blocks in a first order. The fifth step 450 comprises subsequently transmitting a second data packet with the one or more network nodes, the second data packet comprising the plurality of blocks in a different second order. The method may further comprise one or more additional steps comprising transmitting one or more additional data packets with the one or more network nodes, the one or more additional data packets comprising the plurality of blocks in orders that are different to the first and/or second orders.

In embodiments in which the one or more network nodes are a plurality of network nodes, the plurality of network nodes preferably all transmit the first data packet substantially simultaneously and using an identical block order and subsequently transmit the second data packet substantially simultaneously using a block order that is different from the block order used to transmit the first data packet but that is the same for all nodes transmitting the second data packet. The plurality of network nodes may also subsequently transmit any additional data packets substantially simultaneously using identical block orders.

The first and second data packets may comprise other data components in addition to the plurality of blocks. For example, the data packets may comprise a physical layer header and/or a synchronization header, which may be transmitted before the plurality of blocks. Alternatively or additionally, the data packets may comprise an additional error detection code (such as a CRC) which may be calculated from the entire remainder of the packet (from all the parts of the payload, the error detection codes calculated therefrom, any headers comprised by the packet, and any other components excluding the additional error detection code itself). Such an additional error detection code may be referred to as a packet-level error detection code.

The first and second data packets may be physical layer (PHY) protocol data units (PDUs) and/or may be formed by encapsulating higher layer PDUs (such as Media Access Control (MAC) PDUs (MPDUs)) that comprise or consist of the plurality of blocks in the respective first and second orders. For example, the first and second data packets may be formed by encapsulating higher layer PDUs by the addition of headers and packet-level error detection codes). Higher layer PDUs comprising or consisting of the plurality of blocks may therefore define physical layer (PHY) service data units (SDUs).

The first and second orders (and any additional orders) in which the plurality of blocks are transmitted may be pseudo-randomly determined. For example, the orders may be determined using a pseudorandom generator, such as a linear congruential generator. In some embodiments, the one or more nodes that transmit the data packets may pseudo-randomly determine the orders, for example when performing the method. In alternative embodiments, the orders may be pseudo-randomly determined in advance, for example, when compiling computer instructions for the nodes.

The pseudorandom generator may generate the orders from one or more seeds or keys, each of which may be used to generate one or more block orders (for example, the block order for a single timeslot or packet, or a plurality of block orders for each of the timeslots or packets in which a given payload is transmitted). In some embodiments, different seeds or keys may be used to generate the orders with which the blocks are ordered in different packets encoding different payloads and/or transmitted in different timeslots. This may allow different orders to be generated for different packets transmitted in different timeslots (for example the different orders in which the blocks are arranged in the first packet, the second packet and any additional packets).

In embodiments in which the one or more nodes are a plurality of nodes, each of the plurality of nodes may know and use the same one or more seeds or keys. This may advantageously ensure that each of the plurality of nodes reliably generates and uses the same pseudorandom order for a given data packet in a given timeslot. For example, the seeds or keys may be, or may be derived from, a variable shared between the plurality of nodes, such as a timeslot counter. Alternatively, the seeds may be distributed to all of the nodes using a broadcast during a setup stage, and/or may be dependent upon a payload identifier and/or timeslot counter.

In order to reduce memory or processing requirements, the method may use pseudorandom elements and/or payload and/or timeslot counting elements of other transmission methods such as time-slotted channel hopping (TSCH) methods. For example, the seeds or keys used to generate block orders from a pseudorandom generator may be, or may be calculated from, a timeslot counting element from another transmission methods such as a TSCH method. In some embodiments, seeds or keys may be, or may be calculated from, the absolute slot number (ASN) of a time-slotted channel hopping (TSCH) protocol such as 6TiSCH.

Alternatively, or additionally, the orders in which the blocks are transmitted may be determined using a lookup table, which may order the blocks in dependence upon the timeslot in which the packet is transmitted, and/or upon one or more other variables that vary between packet transmissions. In some embodiments, the lookup table may be used in conjunction with a pseudorandom generator as described above. For example, a single output of a pseudo-random generator derived from a seed or key may be used as an index or input for a lookup table comprising a plurality of possible block orders. Alternatively, a series of outputs of a of a pseudo-random generator derived from a seed or key may be used as indices or inputs for a lookup table comprising a plurality of possible blocks, the series of outputs defining the order in which those blocks are arranged.

In some embodiments, the determination of an order of blocks may be analogous to the use of lookup tables to determine a transmission frequency for a data packet from an assigned channel offset value and an absolute slot number in time-slotted channel hopping (TSCH) protocols such as 6TiSCH. The absolute slot number (ASN) used to read blocks from the lookup table B may be the same as the absolute slot number used to read channel frequencies from a lookup table of the TSCH protocol, this may advantageously reduce memory or processing requirements of the method.

In some embodiments, transmitting the data payload may comprise transmitting one or more additional data packets after the second data packet, some or all of the data packets preferably comprising the plurality of blocks in orders different from the first order and the second order. These additional data packets may comprise any of the optional features of the first and second data packets described above.

In some embodiments, the one or more network nodes are a plurality of network nodes, and the first and second data packets (and optionally any additional data packets) may be synchronously transmitted by the plurality of network nodes.

It will be appreciated the first to third steps 410, 420, 430 of the method 400 described above are optional and in some embodiments may not be performed by the one or more nodes that transmit the first and second data packets. In such embodiments, the one or more transmitting network nodes may instead receive the plurality of blocks, the plurality of blocks having been produced by one or more other entities performing the first to third steps 410, 420, 430 described above.

Figure 5A:
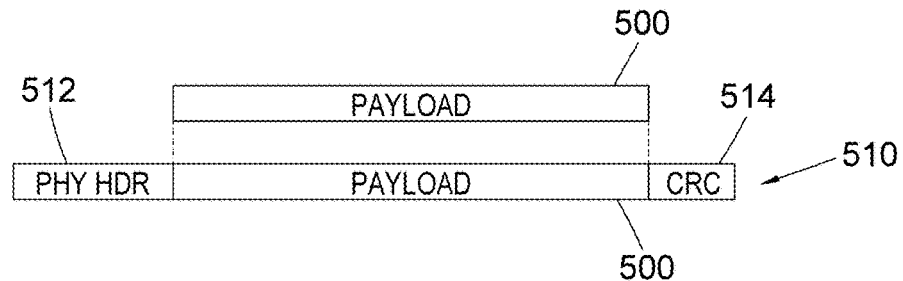
FIG. 5A shows an example of the construction of a data packet from a payload in an unclaimed transmission method that does not divide the payload into separately encoded blocks.

FIG. 5a shows an example of the construction of a data packet 510 from a payload 500 in an unclaimed transmission method that does not divide the payload into separately encoded blocks. Forming the data packet comprises adding a cyclic redundancy check (CRC) error detection code 514 to the end of the payload and a physical layer header 512 to the beginning of the payload. The CRC error detection code 514 is a packet-level CRC calculated from the entire payload 500 and the physical header 512. The physical layer header 512 may comprise information necessary for transmitting the packet 510 such as the address of the transmitting network node, the address of a receiving network node, the length of the packet and/or payload 500, and/or a packet type designation. A preamble and other additional fields (not shown) may also be prepended to the packet before the physical header and may enable nodes receiving the data packet to detect ongoing transmission of a data payload and to synchronize with the transmitting node. The data packet 510 may be define physical layer protocol data unit (PDU) and the payload 512 and the error detection code 514 may define a physical layer service data unit (SDU) and a MAC layer PDU. The format and content of the physical layer header 512 and/or preamble may depend upon the technology with which the packet is transmitted (such as IEEE 802.15.4 or Bluetooth® Low Energy (BLE)).

Figure 5B:
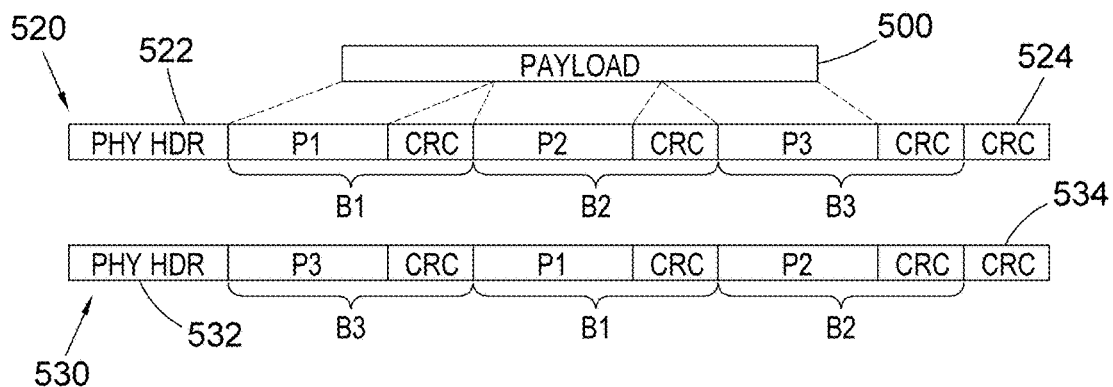
FIG. 5B shows a first example of the construction of first and second data packets with different arrangements of separately encoded blocks from a payload in an embodiment a transmission method.

FIG. 5b shows a first example of the construction of first and second data packets 520, 530 from a payload in an embodiment a transmission method 400 as described above with reference to FIG. 4.

The payload is divided into a three part of equal length, P1, P2, P3, calculating a cyclic redundancy check (CRC) for each part of the payload and appending it to the end of that packet, so as to define a block. A first block B1, second block B2, and third block B3 respectively comprising the first third P1, second third P2, and third P3 of the payload are thereby formed.

The first to third blocks B1, B2, B3 are arranged in different orders in the first and second packets; the order of the blocks in each packet is dependent upon the timeslot in which the packet is to be transmitted and may be determined using a pseudorandom seed or a lookup table.

The first packet is formed by arranging the first to third blocks with the second block B2 following the first block B1, and the third block B3 following the second block B2. A physical layer header PHY HDR is arranged before the first block B1. This order of the three blocks is dependent upon the timeslot in which the first data packet is to be transmitted, and is determined using a pseudorandom seed or a lookup table. A packet-level CDC is calculated from the physical header PHY HDR and the three blocks in B1, B2, B3 in their arranged order and is appended to the end of the packet after the third block B3.

The second packet is formed by arranging the first to third blocks with first block B1 following the third block B3 and the second block B2 following the first block. In the same manner as the first packet, a physical layer header PHY HDR is added to the beginning of the packet and a packet-level CDC is added to the end of the packet.

In some embodiments, a preamble as described above with regards to FIG. 5a may also be appended to the data packet.

Figure 5C:
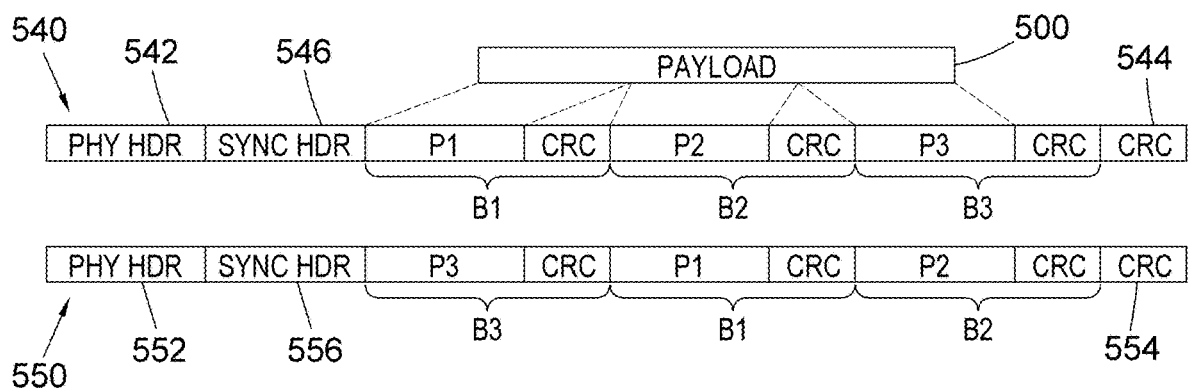
FIG. 5C shows a second example of the construction of first and second data packets with different arrangements of separately encoded blocks from a payload in an embodiment a transmission method.

FIG. 5c shows a second example of the construction of first and second data packets from a payload in an embodiment a transmission method 400 as described above with reference to FIG. 4. The second example differs from the first example described above with reference to FIG. 5b in that the first and second data packets further comprise independently encoded synchronization headers.

A synchronization header SYNC HDR comprising timing information is added to the data packets intermediate the physical layer header and the plurality of blocks; this relatively early location in the data packet may have relatively low bit error probabilities due to desynchronization effects being less than at the end of the packet. Alternatively, the synchronization header may be shuffled with the blocks B1, B2, B3 encoding the payload, such that it may be arranged in different positions in different packets.

The synchronization header may specify the number of times a packet encoding the data payload 500 has been transmitted. For example, the synchronization header may comprise a field specifying the number of times such a packet has been transmitted (a sequence number). This information may be used receiving nodes to determine the time at which, or time since the first transmission of a data packet comprising the data packet (with a sequence number equal to zero).

A cyclic redundancy check is calculated from the synchronization header and added to the end of the synchronization header. This cyclic redundancy check enables the nodes receiving the data packets to receive the synchronization header in partially corrupted packets in the same manner that they can receive individual blocks in such partially corrupted packets. Nodes are able to determine whether they have successfully received the synchronization header without errors using the cyclic redundancy check appended thereto, and if so, to estimate the drift of their clocks relative to a designated time synchronizer node of the network and/or to synchronize themselves with the network.

The packet-level CDCs added to the end of each of the first and second data packets is calculated from the physical header PHY HDR, the synchronization header SYNC HDR, the CRC for the synchronization header, and the three blocks in B1, B2, B3 in their arranged order of that packet.

The addition of a synchronization header may be particularly advantages in embodiments in which packets are transmitted using 1 megabit or 2 megabit un-coded Bluetooth Low Energy physical layers (1M BLE PHY or 2M BLE PHY) which are extremely sensitive to desynchronization between transmitters.

Figure 6:
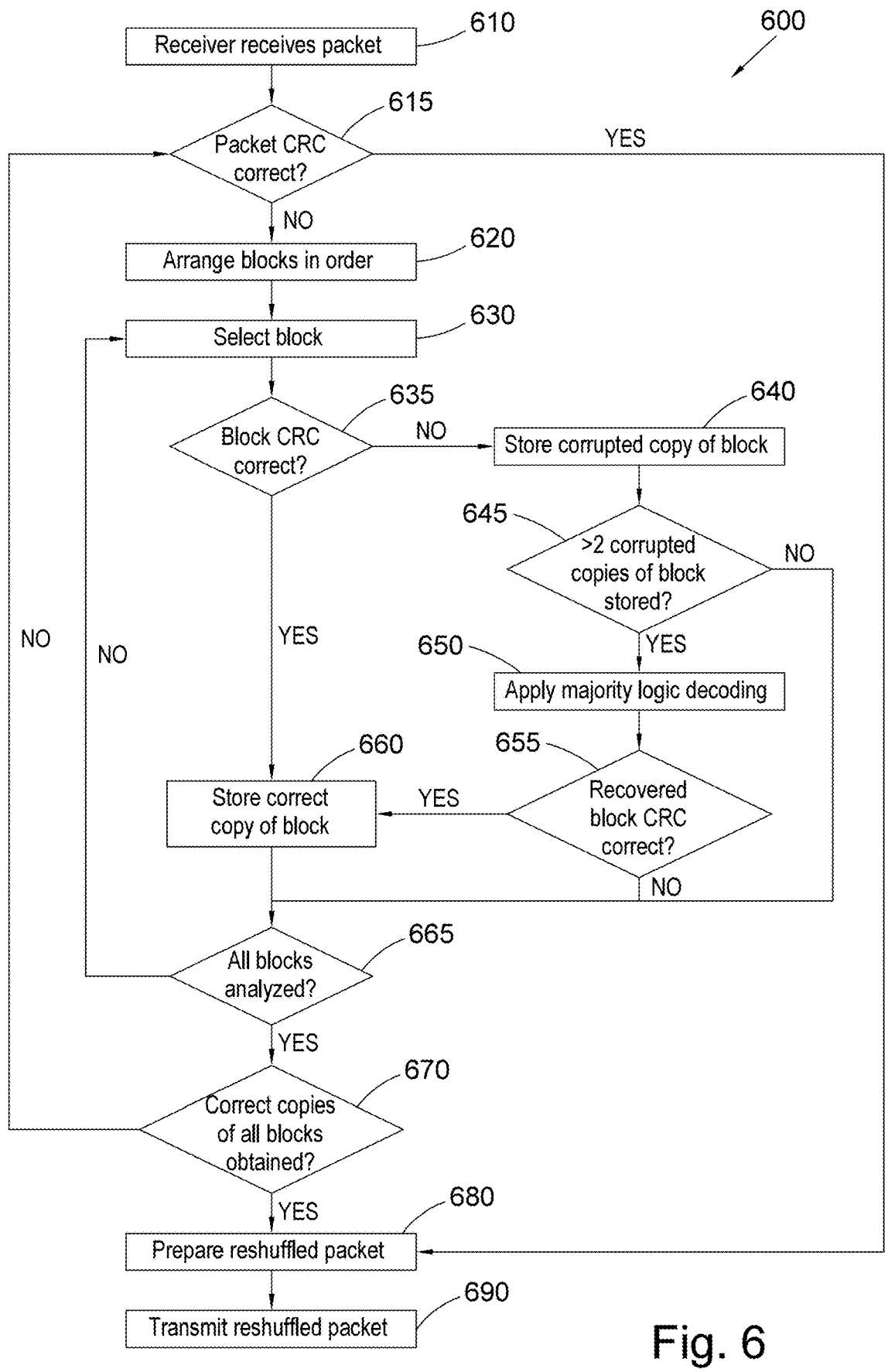
FIG. 6 is a flowchart showing an example of a method 600 of receiving one or more packets comprising the same set of blocks.

FIG. 6 is a flowchart showing an example of an embodiment of a method 600 of receiving and inspecting one or more packets comprising the same set of blocks, identifying errors within the received packets, recovering unsuccessfully received blocks from three or more corrupted packets and transmitting packets comprising the successfully received and/or recovered set of blocks. The method 600 being for use in flooding a payload encoded within the set of blocks.

An initial step 610 of the method 600 comprises receiving a packet with the network node (the receiver). The packet comprises the set of blocks and a packet-level cyclic redundancy check (CRC), with the plurality blocks each encoding a part of a payload and being arranged in an order by the transmitter of the packet (preferably an order corresponding to the timeslot in which the packet was transmitted). This step 610 may be repeated multiple times to receive multiple retransmissions of packets comprising the plurality of blocks, until the receiver has successfully received or recovered all of the blocks, or until timeslots for transmission of the payload expire.

After receiving 610 a packet, the receiver uses the packet-level CRC of the packet to determine 615 whether the entire packet was received without errors.

If the receiver determines 615 that it has successfully received the entire packet (and therefore all the blocks thereof) without errors, it prepares 680 a new data packet comprising the blocks and transmits 690 that packet in a subsequent timeslot. The new packet comprises the same set of blocks as the successfully received packet, but the blocks are arranged in a different order (preferably an order corresponding to the subsequent timeslot of the new packet); the new data packet therefore encodes the same payload as the successfully received data packet. The new packet may be referred to as a reshuffled packet. Preparing 680 the new data packet may comprise reordering the blocks of the successfully received data packet into an order corresponding to the subsequent timeslot, adding any additional components of the packet (such as physical layer and/or synchronization headers), calculating a packet-level CRC from the reordered blocks and any added additional elements, and adding the calculated packet-level CRC.

If the receiver instead determines 615 from the packet-level CRC of the received packet that it has not successfully received the entire packet, the receiver proceeds to analyze individual blocks of the received packet. The receiver determines 635 whether each individual block was correctly received in the packet, and if a given block was not correctly received in the packet, or in any of a plurality of previously received packets comprising the same set of blocks, attempts 650 to recover the block from these corrupted packets using majority logic decoding. In alternative embodiments, this step may be optional, for example in embodiments in which the received data packets do not comprise packet-level error detection codes.

In a step 620 following determining that a received packet was not successfully received in its entirety, the receiver uses the order of the blocks in the received data packet (which preferably corresponds to the timeslot in which the packet was received) to identify which of the blocks encodes which of the plurality of parts of the payload.

In preferred embodiments, the order of the blocks corresponds to the timeslot in which the packet was received and the receiver knows the relationship between the timeslot and the order of blocks therein, for example from a pseudorandom seed shared between the nodes, or from a shared lookup table as described above with reference to FIG. 4. Alternatively, the network node that transmitted the packet may have independently determined the order and may have specified the order in bits comprised by the packet, which may have an error detection code such as a CRC calculated therefrom. However, this approach is less preferable as it does not enable a plurality of network nodes to order the blocks in the same order and simultaneously transmit the packets such that they constructively interfere.

In the illustrated step 620, the receiver rearranges the blocks comprised by the unsuccessfully received packet into the order of the parts of payload encoded in those blocks within the payload from which the blocks were derived. It will be appreciated that in other embodiments the receiver may merely identify which block contains which part of the payload as described above, without rearranging the blocks.

The receiver then analyses blocks of the received packet in turn 630, with the analysis of each block being independent of that of the other blocks of the received packet. In some embodiments, the receiver may analyze each block that does not already have a correct copy stored 660 in the buffer. This reduces use of computational resources and energy, making the method more efficient. Alternatively, the receiver may analyse all of the blocks of the received packet irrespective of whether correct copies of them are stored 660 in the buffet. This may be performed because it is a non-zero probability of an incorrectly received block to be corrupted in such a way that its error detection code is still determined to be correct (for example, because a correct copy of the part of the payload encoded in the packet and the corrupted copy may have an identical hash, and therefore an identical CRC error detection code). Reanalyzing copies of blocks may therefore provide redundancy and increase the reliability of the method.

For each analyzed block of the received packet, the receiver checks 635 whether it received the block without errors using the CRC of that block. If the receiver determines that it did receive that block without errors, it stores 660 the received block in a buffer as a correct copy of the block. In embodiments, as described above where blocks are analyzed even when correct copies of the blocks are already stored 660 in the buffer, when multiple correct copies of blocks are stored in the buffer, majority logic decoding may be applied to the multiple correct copies.

If instead, the receiver determines that the block was received with errors, the block is stored 640 in a buffer as a corrupted copy of that block. This buffer may be the same or different to the buffer in which successfully received blocks are stored. If 645 the received packet is the third or subsequent reception of a packet encoding the payload (and therefore comprising the set of blocks) and no correct copy of the block is stored in the buffer, the receiver applies majority logic decoding 650 to the plurality of corrupted copies of the block stored in the buffer.

Figure 7:
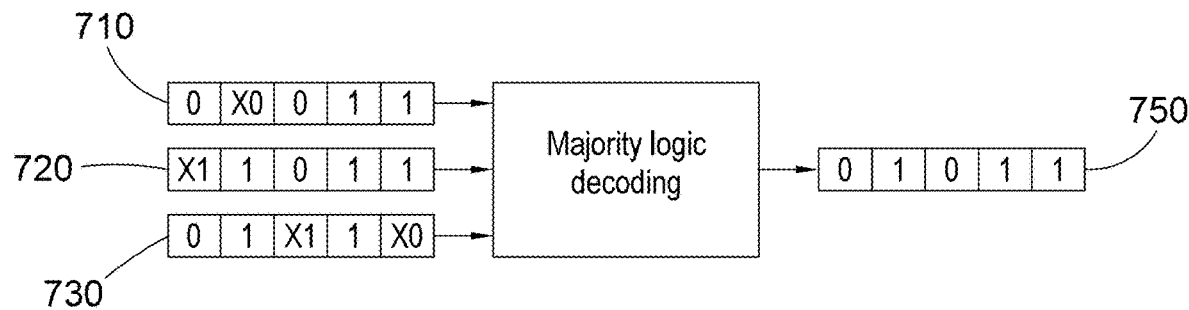
FIG. 7 shows an example of applying majority logic to recover a block of bits from three corrupted copies of the block.

Applying majority logic decoding 650 determines the most common value (1 or 0) for each bit position in the three or more corrupted copies of the block. FIG. 7 shows an example of majority logic decoding being applied to three corrupted copies of a 5 bit block that originally read 01011 but have been received with errors. The first corrupted block 710 has an error in its second bit and reads 00011, the second corrupted block 720 has an error in its first bit and reads 11011, and the third corrupted block has errors in its third and final bits and reads 01110. As the majority of receptions of each given bit were correct, applying majority logic decoding successfully recovers the original block 750 which reads 01011.

The majority logic decoding may be applied at the MAC layer of the data packet. The physical layer of the data may utilize other known signal processing methods for recovering corrupted bits of a transmission, which may involve incorporating redundancy into the transmitted signal. In the MAC layer, low level signal properties are not considered; instead, data processing is applied on top of decoded, potentially corrupted data.

In some embodiments, the Boyer-Moore majority vote algorithm may be used to determine the majority value for each bit position of the plurality of corrupted copies of the block. In some embodiments, the receiver may only apply majority logic decoding to the plurality of corrupted copies of the block when the number of corrupted copies is odd, thereby avoiding situations in which the number of times a bit position has a value of 1 is equal to the number of times it has a value of 0.

After majority logic decoding is applied 650 to recover a block from the three or more corrupted copies of the block, the CRC of the recovered block is checked 655 to determine whether it was correctly recovered. If the CRC of the recovered block is correct, the recovered block is stored 660 as a correct copy in the buffer in the same manner as blocks received with correct CRCs. If the CRC of the recovered block is incorrect, the recovered block is discarded.

After the analysis of a block is complete (ending with storing 660 a received or recovered block being as a correct copy of that block, discarding an unsuccessfully recovered block, or storing a first or second corrupted copy of a block), the receiver determines 665 whether all blocks of the received have been analyzed. If not all the blocks of the received packet have been analyzed, the receiver selects 630 the next unanalyzed block and repeats the steps 635, 640, 645, 650, 655, 660 described above. This is repeated until all blocks of the received packet have been analyzed, after which the receiver determines 670 whether correct copies of all of the blocks of the set have been stored during the reception of the packet or of previous packets comprising the same blocks.

It will be appreciated that the steps 640, 645, 650, 655 relating to storing and analyzing corrupted copies of the are optional, and in other embodiments if the receiver determines in step 635 that the block was received with errors, the receiver proceeds to step 665 where it determines whether all blocks have been analyzed.

If correct copies of all the blocks have been stored 660, the receiver prepares 680 and transmits 690 a new data packet as described above with reference to the packet-level CRC of a packet indicating the entire packet was received correctly. As described above, preparing 680 the new data packet may comprise reordering the blocks into an order corresponding to a subsequent timeslot, adding any additional components of the packet (such as physical layer and/or synchronization headers), calculating a packet-level CRC from the reordered blocks and any added additional elements, and adding the calculated packet-level CRC.

If a correct copy of one or more of the blocks has not been stored 660, the receiver having not successfully received the entire payload listens to receive another packet comprising the blocks in a subsequent timeslot.

The receiver retains the correct and/or corrupted copies of each of the blocks stored in the buffer or buffers until the receiver determines that transmissions of packets encoding the payload whose parts are encoded therein are complete. The receiver may make such a determination upon receiving a packet encoding a different payload (which the receiver may identify from a packet ID comprised by the packet), and/or when an period of time and/or a number of timeslots assigned to that payload and counted by the receiver are complete.

For example, upon receiving 610 a packet, the receiver may check a packet ID comprised by the packet (for example, by one or more fields of the payload encoded within the packet) to determine whether that packet is a retransmission of the same payload (and comprises the same blocks) as a payload encoded in an immediately preceding received packet. If the packet ID is the same as the preceding received packet, the remaining steps of the method 600 are repeated without modification. If instead, the packet ID is different from that of the preceding received packet, then the receiver identifies either that it has received a packet encoding a different payload, or that the bits encoding the packet ID have been corrupted. The receiver then wipes the stored correct and corrupted copies of the blocks from the buffer or buffers before repeating the remaining steps of the method 600.

Figure 8:
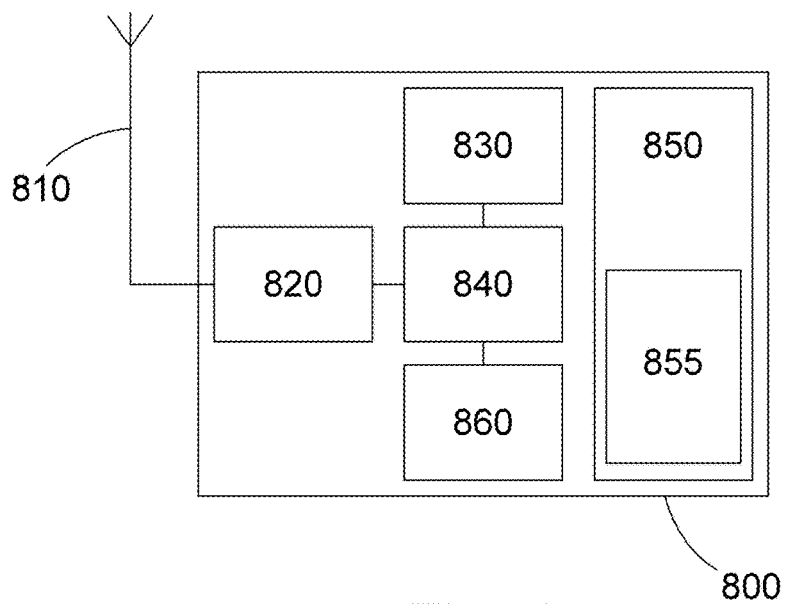
FIG. 8 shows an example of an embodiment of a wireless device.

FIG. 8 shows an example of an embodiment of a wireless device 800 configured to transmit and receive wireless packets comprising arrangements of blocks encoding parts of a payload. The wireless device 800 comprises an antenna 810, an input/output module 820, a buffer 830, a processor 840, a memory 850, and a clock 860.

The input input/output module 820 is connected to the antenna 810, which is configured to receive signals from, and to transmit signals to, other wireless devices in communication with the illustrated wireless device 800 using one or more wireless networks. The processor 840 is coupled to the input/output module 820, the buffer 830, the memory 850 and the clock 860. The memory 850 stores computer instructions 855 that when executed cause the processor to implement steps of a methods for transmitting or receiving data packets comprising sets of blocks encoding parts of a data payload.

When receiving data packets, the processor 840 may identify correct and corrupted copies of blocks of data packets in the buffer 830 as described above with reference to FIG. 6. The processor 840 may use the clock to determine the timeslot within which it is transmitting or receiving data packets, and what the order of blocks are within the transmitted or received data packet. The processor 840 may update the clock 860 in response to synchronization headers comprised by data packets received by the wireless device 800.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method comprising:
transmitting a first data packet, the first data packet comprising a set of blocks arranged in a first order; and
transmitting a second data packet after transmitting the first data packet, the second data packet comprising the set of blocks arranged in a second order that is different from the first order,
wherein a first block and a second block of the set of blocks comprise a different section of a data payload; and
wherein sections of the data payload comprised by blocks of the set of blocks define an entire data payload.

2. The method according to claim 1, wherein the first data packet and second data packet are transmitted simultaneously.

3. The method according to claim 1, wherein the first and second orders in which the set of blocks are arranged in the first and second data packets are determined based on a tune at, or a timeslot in which, the data packets are transmitted.

4. The method according to claim 3, wherein the first and second orders are determined using a timeslot counter of a time slotted channel hopping channel access method.

5. The method according to claim 1, wherein the first block of the set of blocks comprises an error detection code calculated from the sections of the data payload that is comprised by the first block.

6. The method according to claim 5, wherein the error detection code comprised by the first block of the set of blocks is a cyclic redundancy check.

7. The method according to claim 1, wherein the first data packet further comprises a packet-level error detection code calculated from all parts of the first data packet other than the packet-level error detection code itself.

8. The method according to claim 1, wherein the first and second orders in which the set of blocks are arranged in the first and second data packets are determined using a lookup table.

9. A method comprising:
receiving a data packet comprising a set of blocks, a first block and a second block of the set of blocks comprising a part of data payload and an error detection code;

identifying the first block and the second block of the set of blocks within the data packet;

checking the error detection code comprised by at least one identified block of the set of blocks to determine whether that the at least one identified block was received with errors;

saving a block that is determined to have been received without errors in a buffer as a correct copy of the at least one identified block; and determining if the buffer contains a correct copy of the at least one identified block of the set of blocks, and inspecting a subsequent data packet if the buffer does not contain a correct copy of the at least one identified block of the set of blocks.

10. The method according to claim 9, wherein the first block of the set of blocks is identified within the data packet using an order of the blocks that is determined from a time at, or a timeslot in which, the packet is received.

11. The method according to claim 9, further comprising saving the first block that is determined to have been received with errors in a buffer as a corrupted copy of the first block;

applying majority logic decoding to three or more corrupted copies of a corrupted block to recover a copy of the first block, checking the error detection code comprised by a recovered block to determine whether the recovered block comprises errors; and saving the recovered copy of the block as a correct copy of the block if the recovered copy of the block is determined to not comprise errors.

12. The method according to claim 9, further comprising checking the error detection code of the identified block of the set of blocks that a correct copy of is not stored in the buffer.

13. The method according to claim 9, further comprising checking the error detection code of the identified block of the set of blocks and applying majority logic decoding to three or more correct copies of a block stored in the buffer if three or more correct copies of that block are stored in the buffer.

14. The method according to claim 9, wherein the data packet further comprises a packet-level error detection code calculated from all parts of the data packet other than the packet-level error detection code itself, and the method further comprising checking the packet-level error detection code of the data to determine whether an entire data packet was received without errors.

15. The method according to claim 9, wherein the data packet further comprises a packet ID and wherein inspecting a subsequent data packet comprises checking the packet ID of a received data packet to determine whether the subsequent data packet comprises the same set of blocks as a preceding data packet, and wherein the method further comprises discarding copies of blocks stored in the buffer if the subsequent data packet is determined to comprise a different set of blocks to the preceding data packet.

16. A method comprising:

transmitting a first data packet, the first data packet comprising a set of blocks arranged in a first order; a first block and a second block of the set of blocks comprising a different section of a data payload and an error detection code calculated from the different section of the data payload, and the sections of the data payload comprised by blocks of the set of blocks defining an entire data payload;

transmitting a second data packet after transmitting the first data packet, the second data packet comprising the set of blocks arranged in a second order that is different from the first order; and inspecting at least the first data packet with a network node, wherein inspecting a data packet comprises:

identifying the first block and the second block of the set of blocks within the data packet;

checking the error detection code comprised by at least one identified block of the set of blocks to determine whether the at least one identified block was received with errors;

saving a block that is determined to have been received without errors in a buffer as a correct copy of the at least one identified block; and determining if the buffer contains a correct copy of the at least one identified block of the set of blocks, wherein the method further comprises inspecting the second data packet if the buffer does not contain a correct copy of the at least one identified block of the set of blocks upon inspecting the first data packet.

17. A wireless network node comprising:

a transmitter configured to transmit a first data packet, the first data packet comprising a set of blocks arranged in a first order, and to transmit a second data packet after transmitting the first data packet, the second data packet comprising the set of blocks arranged in a second order that is different from the first order, wherein a first block and a second block of the set of blocks comprise a different section of a data payload, and wherein the sections of the data payload comprised by blocks of the set of blocks define the entire data payload.

18. A wireless network node comprising:

a receiver configured to receive a data packet comprising a set of blocks, a first block and a second block of the set of blocks comprising a part of data payload and an error detection code; and a processor configured to:

identifying each identify the first block and the second block of the set of blocks within the received data packet;

check the error detection code comprised by at least one identified block of the set of blocks to determine whether the at least one identified block was received with errors;

save a block that is determined to have been received without errors in a buffer as a correct copy of the at least one identified block; and determine if the buffer contains a correct copy of the at least one identified block of the set of blocks, and inspecting a subsequent data packet if the buffer does not contain a correct copy of the at least one identified block of the set of blocks.

19. One or more non-transitory computer readable storage media comprising computer instructions executable by one or more processors, the computer instructions when executed by the one or more processors causing the one or more processors to perform a method, the method comprising:

transmitting a first data packet, the first data packet comprising a set of blocks arranged in a first order; and transmitting a second data packet after transmitting the first data packet, the second data packet comprising the set of blocks arranged in a second order that is different from the first order;

wherein a first block and a second block of the set of blocks comprise a different section of a data payload; and wherein the sections of the data payload comprised by blocks of the set of blocks define the entire data payload.

20. One or more non-transitory computer readable storage media comprising computer instructions executable by one or more processors, the computer instructions when executed by the one or more processors causing the one or more processors to perform a method, the method comprising:

receiving a data packet comprising a set of blocks, a first block and a second block of the set of blocks comprising a part of data payload and an error detection code;

identifying the first block and the second block of the set of blocks within the data packet;

checking the error detection code comprised by at least one identified block of the set of blocks to determine whether the at least one identified block was received with errors;

saving a block that is determined to have been received without errors in a buffer as a correct copy of the at least one identified block; and determining if the buffer contains a correct copy of the at least one identified block of the set of blocks, and inspecting a subsequent data packet if the buffer does not contain a correct copy of the at least one identified block of the set of blocks.

\* \* \* \* \*